Feb. 1, 1944.  F. A. MARTIN  2,340,401
TEAR TESTING APPARATUS FOR RUBBER STOCK
Filed April 14, 1941  2 Sheets-Sheet 1

INVENTOR
Frank A. Martin
BY
Harry S. Dumars
ATTORNEY

Feb. 1, 1944.   F. A. MARTIN   2,340,401
TEAR TESTING APPARATUS FOR RUBBER STOCK
Filed April 14, 1941   2 Sheets-Sheet 2

INVENTOR
Frank A. Martin
BY
Harry S. Demarse
ATTORNEY

UNITED STATES PATENT OFFICE 2,340,401

TEAR TESTING APPARATUS FOR RUBBER STOCK

Frank A. Martin, North Canton, Ohio, assignor to The Hoover Company, North Canton, Ohio, a corporation of Ohio Application April 14, 1941, Serial No. 388,462

4 Claims. (Cl. 265—12)

This invention relates to improvements in tear testing apparatus for rubber stock and more particularly to an improved device for carrying out what is generally termed the "tear test" of samples of rubber stock to be used in the manufacture of mechanical rubber parts such as drive belts and the like.

As well known in the rubber industry, raw rubber stock is compounded of several ingredients and ultimately subjected to a heating process known as "curing." Moreover, rubber compounds do not always react in a stable manner, and as a result variations in the quality and properties of the rubber are often quite marked.

Consequently, manufacturers of rubber products make it a practice to subject the rubber stock to a series of tests before it is used. For the most part, these tests indicate certain physical properties of a particular batch of rubber, such as tensile strength, elongation, permanent set, elasticity, specific gravity, as well as the so-called tear test with which the present disclosure is concerned.

Of the several tests above enumerated, the names more or less suggest their nature and purpose with the exception perhaps of the tear test, although even this suggests a determination of the resistance of a sample to a tearing force. However, it does not indicate how the tearing action is initiated.

Given a narrow strip of rubber, it is self-evident that if stretched beyond its elastic limits, it will eventually break and the breaking force would be an indication of its tensile strength. But on the other hand, if the same strip is elongated, say, to four times its initial length and a sharp blade is pressed against one edge, a cutting or severing action will eventually occur and when the blade does cut through to a certain depth, the remaining width will be parted by the tearing of the rubber. It is not difficult to distinguish between the portion of the strip severed by cutting and the portion severed by tearing, so that by measuring the depth of the cut it is possible to determine the index of tear resistance of the particular rubber stock tested. This index, in turn, bears a definite relation to the degree of curing, as witness the fact that under-cured stock exhibits a greater degree of tear resistance than over-cured stock. Hence, the tear test indicates primarily the degree of cure and this determines in large measure, the ability of the finished product to stand up under the required working conditions.

Having thus described the so-called tear test and the purpose thereof, the apparatus for performing this test will now be described, although it perhaps should be pointed out that the same test has been used heretofore, although not with the precision and exactness made possible by the improved testing apparatus. Briefly, it has been the practice heretofore to place a sample strip under tension and then to cut with a razor blade held in the hand of the tester. But this method is not productive of accurate results and for the obvious reason that the human hand is not susceptible of that degree of muscular control necessary to insure a uniformly applied cutting pressure and a cessation of the cutting pressure at the instant the strip begins to tear.

A preferred embodiment of the apparatus is disclosed in the accompanying drawings, in which.

The foundation of the tear testing apparatus may be any standard machine for testing the tensile strength of materials and consisting generally of a vertical frame supporting a pair of movable jaw members 1, 1, and suitable mechanism (not shown) for shifting these jaw members toward and from each other in a straight line and against the resistance offered by the material being tested.

Testing apparatus of this character is common in testing laboratories and therefore it is not deemed necessary to show more than the gripping jaws 1, 1 preferably mounted at the end of stout slide rods 2, 2, moving vertically endwise under power derived mechanically or hydraulically as the case may be.

Figure 3:
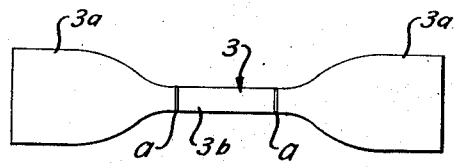
Figure 3 is a view in elevation of a test strip in its normal condition.
Figure 4:
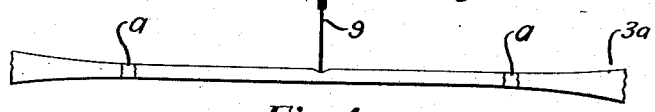
Figure 4 is a view of the test strip under tension and the initial cut being inflicted.

The rubber stock to be tested is preferably made up in sheets from which are cut the samples which, because of their shape, are sometimes referred to as "dumb-bell" samples (see Figure 3). Thus, these samples have the form of thin slabs of rubber of say, $\frac{1}{16}$ of an inch in thickness, with wide end portions 3a, 3a and a relatively narrow central section 3b of uniform width. The wide end sections 3a are held firmly in the jaws 1, 1, the latter consisting generally of blocks 1a, 1a carried at the ends of the slide rods 2, 2 and supporting pivoted jaw members 1b, 1b which can be manipulated to securely clamp the ends of the test sample against the faces of blocks without slipping.

Offset at one side of the vertical line of the gripping jaws 1, 1 is the cutting blade holder consisting of an elongated block 4 arranged horizontally and at right angles to the strip undergoing test and mounted for bodily sliding adjustment upon a rigid vertical rod 5 forming a part of the main frame of the testing machine (not shown). At the forward end of the block 4 is an offset bearing portion 4a with a vertical bore through which the supporting slide rod passes. An adjusting screw 6 with a knurled head serves to hold the block 4 in a given position on the vertical rod 5.

The block 4 is bored centrally from end to end to receive an endwise sliding rod 7 projecting from opposite ends of the block. At the end of the rod adjacent the tensioning device is a flat head 8 which serves as a holder for a cutting blade 9, preferably a standard safety razor blade. The opposite or far end of the slide rod 7 is cut with relatively fine threads and carries an adjusting nut 10 with a knurled portion 10a for manually adjusting the bar endwise, together with an annular dial 10b having a micrometer scale around its periphery and registering with a fixed point 11 on the adjacent edge of the block 4. This scale is used for measuring the actual displacement of the slide rod 7 for any given number of revolutions of the adjusting nut or a fraction thereof. Incidentally, the slide rod 7 is held against rotation in its supporting block 4 by a suitable key and slot arrangement, shown at 12 in Figure 2.

As a preferable arrangement, provision is made for temporarily disengaging the micrometer adjustment so that the slide rod 7 can be retracted without having to turn the adjusting nut. Thus, between the knurled end portion 10a and the dial 10b of the adjusting nut, there is an annular channel 10c in which normally rides a curved pawl 13 pivotally mounted on the end face of the block 4, as clearly shown in Figure 2. When the pawl engages the groove or channel 10c no movement of nut 10 axially with slide rod 7 can take place and the rod can only be adjusted endwise by turning the adjusting nut. But upon lifting the pawl from its channel 10c in the nut to the position shown in Figure 2 the nut and the rod are free to slide in either direction as a unit thus making it possible to shift the blade quickly from one position to another without using the threaded adjustment.

Figure 1:
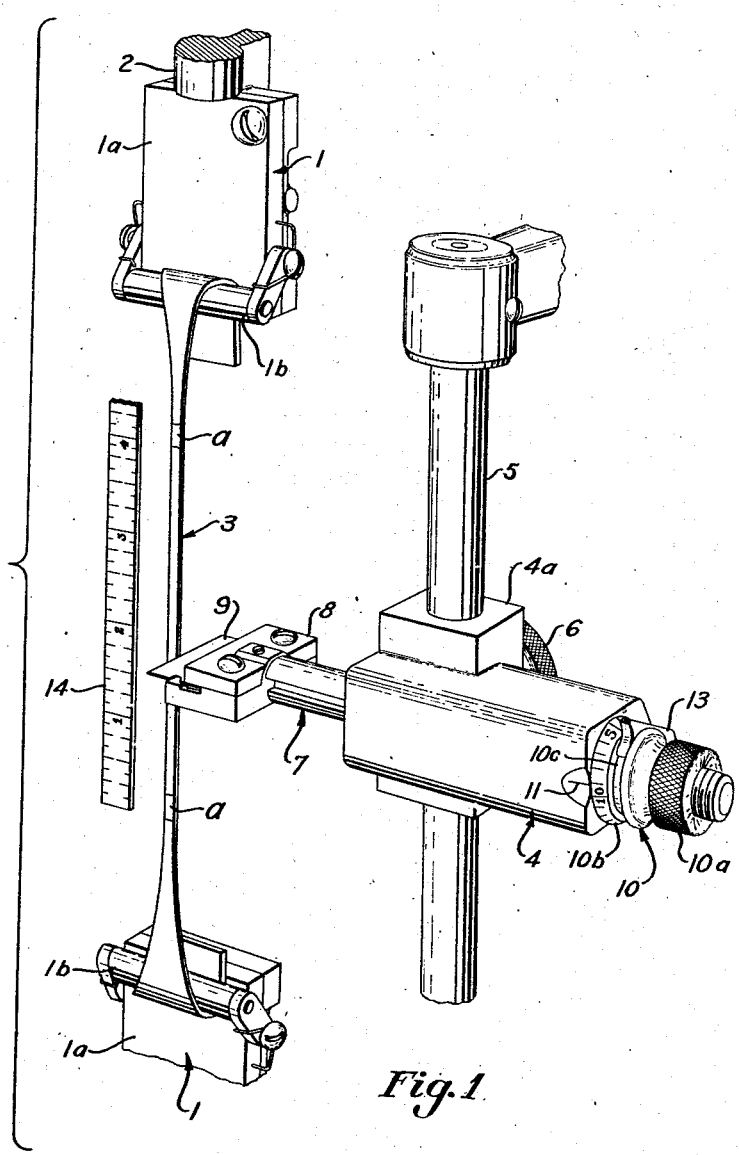
Figure 1 is a general view in perspective of the essential features of the test apparatus showing the test strip under tension and the blade about to be applied.
Figure 2:
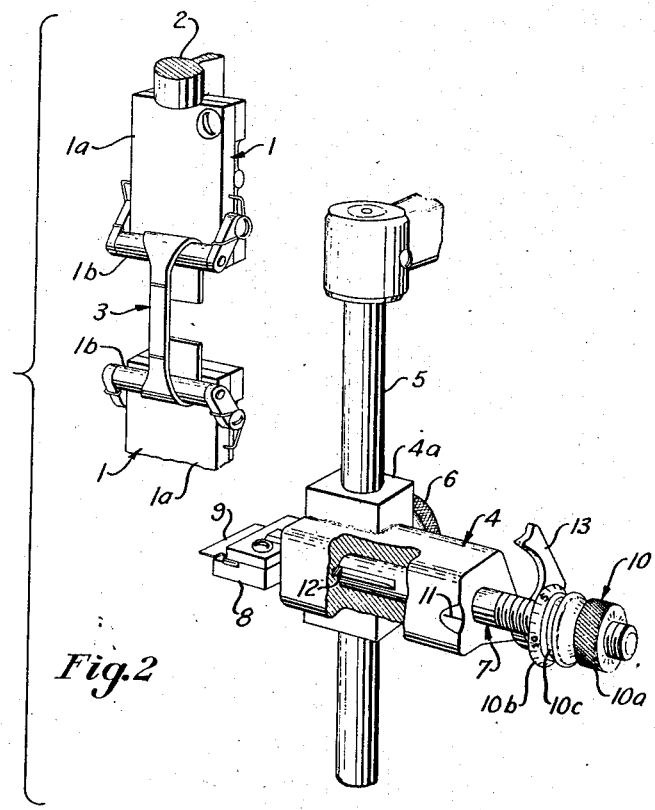
Figure 2 is a view similar to Figure 1 showing the cutting blade retracted during the operation of inserting or removing the test strip from the tensioning device.

Now, as clearly shown in Figure 1, the edge of the blade should traverse the sample 3 undergoing test, substantially intermediate of its ends or, more particularly, midway between two gauge marks a—a positioned near the ends of the relatively narrow central portion 3b of the sample. These marks a—a are placed on the sample preparatory to the test, and at a known distance apart as shown in Figure 3. The sample is then placed into the testing machine by clamping its wide end portions to the clamping jaws 1—1, while the latter are in retracted position as shown in Figure 2. The clamping jaw members are then separated until the sample has been stretched to say four times its normal length, with the measurement being taken between the gauge marks a—a by means of a measuring rule 14 (Figure 1).

Now, with the sample thus stretched, the operator proceeds with the actual test which consists first, of advancing the blade 9 into contact with the side edge of the narrow stretched portion but without applying sufficient pressure to make an incision. The test operator now notes the reading on the micrometer scale on the adjusting nut, this being the starting point or zero depth of the cut to be inflicted on the sample. With the initial setting thus determined, the tester turns the adjusting nut very slowly, advancing the cutting blade into the edge of the sample. At first there may be some slight deflection of the strip from a straight line, but as the blade continues to advance, a sudden breaking or severance of the strip will occur, very much like the snapping of a rubber band at a weakened point. Instantly the break occurs, the tester stops turning the adjusting nut and from the dial takes a direct reading of the distance actually traversed by the blade during the cutting operation.

Figure 5:
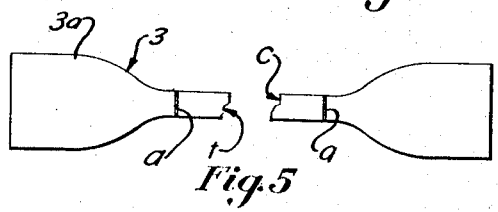
Figure 5 shows the test strip after it has been severed and the ends brought together for measuring.

The sample is then removed from the testing machine and the two halves are brought together with their severed end portions abutting, as shown in Figure 5. From the appearance of the severed edges it is a simple matter to determine visually the proportion of the transverse line of severing caused by cutting and the portion by tearing. Thus, the line of cutting c appears as a straight clean break, whereas the line tear t presents a more uneven and somewhat irregular line of severance. In fact, the difference between the two lines of severance is very much the same as that presented by a strip of paper that is partially cut and then torn.

Now, the measured depth of the cut in the sample will not be equal to the distance actually traveled by the cutting edge during the test, because the sample is under tension during the actual cutting. Then again, the stretched sample exhibits some degree of resistance to cutting and consequently there will be some deflection of the strip from a straight line before any cutting takes place. But as soon as the blade does begin to sever the tensioned strip, it tends to resume its initial straight line as the depth of cut equalizes the deflection, and from there on the cutting progresses with practically little or no further deflection. In other words, once the initial resistance to cutting is overcome, the cutting action proceeds at the same rate at which the cutting blade is advanced until the point is reached at which the unsevered portion of the strip is no longer able to withstand the strain and then it tears across the remaining width faster than it can be cut.

It follows then, that the greater the depth to which it is possible to sever the strip before it tears or ruptures, the greater the property of the stock to undergo stress without failure. Moreover, it indicates a degree of toughness and elasticity which has to do with the lasting qualities of the stock quite apart from its mere tensile strength. In fact, the tear test is not an index of tensile strength because at no time are the samples stretched to their elastic limit.

Now, in practice, it is always desirable to repeat the same test on a number of samples from the same batch, in order to compensate for any variation in the samples or the conditions under which the tests are performed. Thus, the average depth of cut of the several samples is taken as the index, which may be expressed in a percentage obtained by dividing the depth of cut in inches by the total width of the test strip in inches.

The index expressed in percentage will obviously vary directly with the micrometer reading on the dial 10b of the adjusting nut 10. In other words, if a chart were prepared with the index figure as the ordinates and the readings of the test device as the abscissa, the theoretical curve would be a straight line passing through the zero point at 45 degrees. Such a chart is not always used in practice, however, but if it were, the test results would be graphically represented by curves plotted thereon for comparison with the theoretical curve.

For example, if the plotted curve lies above the theoretical curve, over-curing would be indicated because over-cured stock loses some of its toughness and this is evidenced by a greater relative displacement of the cutting blade (as is indicated by the micrometer reading), and this would throw the plotted curve above the theoretical curve. On the other hand, rubber stock that is under-cured undergoes greater deflection in contact with the cutting blade before it is severed. Consequently, the depth of cut is relatively greater than the displacement of the cutting blade and this causes the curve to drop below the theoretical curve.

As a practical matter a tear test is employed primarily as a final check on the characteristics of a particular rubber stock, rather than as a means for determining the proper degree of cure. In other words, the results of the tear test indicate whether or not a particular stock will meet the conditions of use to which it is to be put and in carrying out this purpose, the improved apparatus performs its function with greater certainty and despatch than has heretofore been possible with the comparatively crude methods of cutting the samples by hand.

And finally, it is to be understood that the procedure in carrying out these tests may be varied with different grades of rubber. For instance, some grates of rubber will respond to tests with better results if elongated under a load measured in pounds per square inch, say 1500 pounds per square inch or thereabouts, instead of merely elongating the samples to a predetermined increased length as hereinbefore suggested. And in other respects, the exact mode of carrying out the tests may be varied as conditions demand without departing from the spirit of the invention.

In any case, a preferred embodiment of the invention has been herein set forth.

I claim:

1. In a tear testing apparatus for rubber stock, means for holding a sample strip of said stock under a predetermined fixed tension, means to reduce the area of a section of said strip lying in a plane at right angles to the direction of tension until said strip tears and comprising a cutting member movable in said plane into said strip, manually operable means for adjusting said cutting member, and means for indicating the cutting displacement of said cutting member into said strip with said strip under said tension and at the instant of failure when the remaining uncut area of said section of said strip tears under said tension.

2. In a tear testing apparatus for rubber stock; means for holding a sample strip of said stock at spaced points and exerting a constant tension thereon; means to cut said strip gradually between said points until the constant tension effects a tear at the cut and comprising a cutting blade and means mounting said blade for movement along said strip and toward and from said strip; said means mounting said blade for movement toward and from said strip comprising a support, a shaft slidable therein and threaded exteriorly thereof, an adjusting nut threaded on said shaft and slidable therewith, and nut-locking manually operable means carried by said support engageable with said nut to prevent movement thereof axially of said shaft only; and means to measure the lineal cutting displacement of said blade into said strip from the exterior thereof to the point at which tearing occurs.

3. In a tear testing apparatus for rubber stock, means for exerting a fixed tension on a sample strip of said stock, manually operable means to reduce the width of a section of said strip under said fixed tension in measurable decrements, until said strip fails under said fixed tension by a tear initiated in the remaining width of said section, and visual means to record the total of the decrements of said width with said strip under tension at the time of failure.

4. In a tear testing apparatus, means for exerting a constant uniform tension on a sample strip of stock, a cutting member, means to advance said cutting member from an exterior surface of said strip into the latter until the uncut section of said strip fails under said constant uniform tension, and means for measuring the extent of the cut in said strip under tension at the time of said failure.

FRANK A. MARTIN.